(12) United States Patent
Tsuchiya et al.

(10) Patent No.: US 9,844,722 B2
(45) Date of Patent: Dec. 19, 2017

(54) GAME SYSTEM, CONTROLLER, GAME DEVICE, CONTROL METHOD FOR GAME DEVICE, AND PROGRAM

(71) Applicant: Sony Computer Entertainment Inc., Tokyo (JP)

(72) Inventors: Akitsugu Tsuchiya, Kanagawa (JP); Syunsuke Bamba, Tokyo (JP); Yoshihiko Suwa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 209 days.

(21) Appl. No.: 15/016,694

(22) Filed: Feb. 5, 2016

(65) Prior Publication Data
US 2016/0250548 A1 Sep. 1, 2016

(30) Foreign Application Priority Data
Feb. 27, 2015 (JP) .................................. 2015-039489

(51) Int. Cl.
*A63F 13/42* (2014.01)
*A63F 13/20* (2014.01)
(Continued)

(52) U.S. Cl.
CPC .............. *A63F 13/20* (2014.09); *A63F 13/42* (2014.09); *A63F 13/493* (2014.09); *H04N 2005/4442* (2013.01)

(58) Field of Classification Search
CPC ......... A63F 13/20; A63F 13/42; A63F 13/493
See application file for complete search history.

(56) References Cited

U.S. PATENT DOCUMENTS

| 9,440,144 B2 | 9/2016 | Mikhailov | |
|---|---|---|---|
| 2005/0181878 A1* | 8/2005 | Danieli | A63F 13/12 463/42 |

(Continued)

FOREIGN PATENT DOCUMENTS

| JP | 3098896 U | 3/2004 |
|---|---|---|
| JP | 2006350473 A | 12/2006 |

(Continued)

OTHER PUBLICATIONS

Office Action for corresponding JP Patent Application No. 2015-039489, 8 pages, dated Sep. 27, 2016.

(Continued)

*Primary Examiner* — Corbett B Coburn
(74) *Attorney, Agent, or Firm* — Matthew B. Dernier, Esq.

(57) ABSTRACT

A game system includes a game device used by first and second users and a controller. The game device includes: an association section associating the controller with the first user using the controller; a first process executing section executing a process of a general-purpose function in accordance with first operating information acquired from the controller when the general-purpose function, not associated with the users, executes; and a second process executing section executing a process of a first user function in accordance with second operating information acquired from the controller when the first user function, associated with the first user, executes. The controller includes: first and second operating members associated with the first and second operating information, respectively; an operation receiving section receiving an operation on the operating member; and an operating information outputting section outputting the operating information associated with the operation on operating member to the game device.

7 Claims, 13 Drawing Sheets

(51) Int. Cl.
*A63F 13/493* (2014.01)
*H04N 5/44* (2011.01)

(56) References Cited

U.S. PATENT DOCUMENTS

| | | | |
|---|---|---|---|
| 2012/0268360 A1 | 10/2012 | Mikhailov | |
| 2013/0084975 A1* | 4/2013 | Erickson | G07F 17/3209 463/29 |
| 2015/0379258 A1 | 12/2015 | Hino | |
| 2016/0082355 A1 | 3/2016 | Kobayashi | |

FOREIGN PATENT DOCUMENTS

| | | | |
|---|---|---|---|
| JP | 2012223566 A | 11/2012 |
| WO | 2014130321 A2 | 8/2014 |
| WO | 2014196109 A1 | 12/2014 |

OTHER PUBLICATIONS

Torne Ver. 1.0, Sony Computer Entertainment Inc., 14 pages, Aug. 19, 2010. (for relevancy see Office Action for aorresponding JP Patent Application No. 2015-039489, 8 pages, dated Sep. 27, 2016).
Search Report for corresponding European Patent Application No. 16155409, 6 pages, dated Jul. 8, 2016.
Wikipedia: "Wikipedia—Wii U". XP055284427. Retrieved from the Internet: URL:https:jjen.wikipedia.orgjwjindex.php?title=Wii U&oldid=530655451, 12 pages, Dec. 31, 2012.
Wikipedia: "Wikipedia—Mario Kart 8". XP055284459. Retrieved from the Internet: URL:https:jjen.wikipedia.orgjwjindex.php?title=Mario Kart 8&oldid=648428397, 6 pages, Feb. 23, 2015.
Anonymous: "Logitech Harmony Ultimate universal remote review—CNET". XP055284466. Retrieved from the Internet: URL:https:jjweb.archive.orgjweb/20140330044053/http://www.cnet.comjproductsjlogitech-harmony-ultimate/ 7 pages, Mar. 30, 2014.

* cited by examiner

F I G . 5
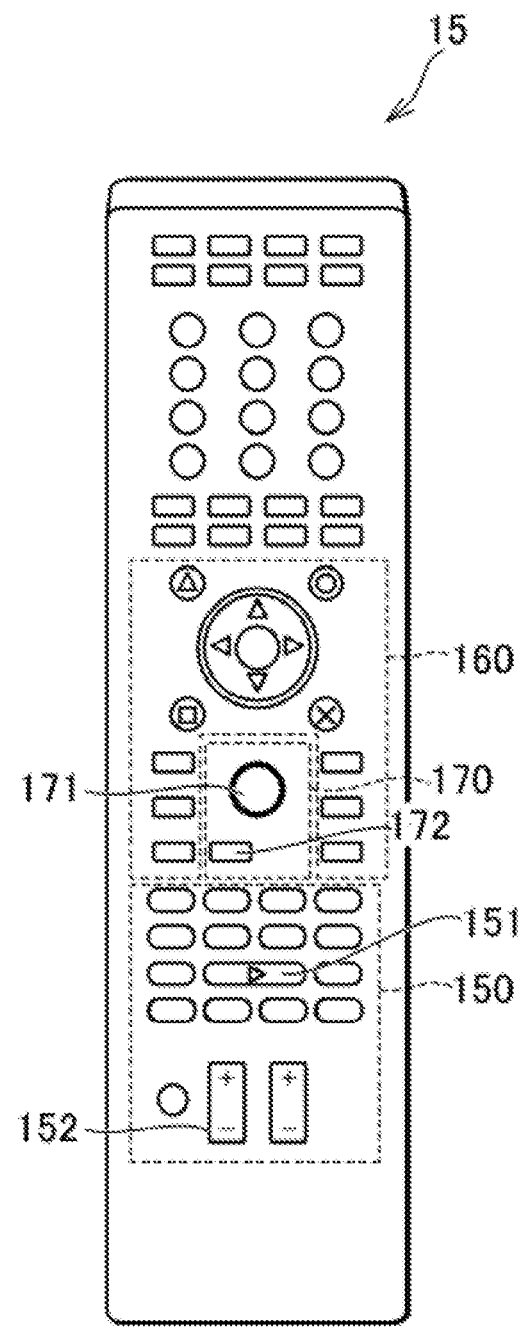

GAME SYSTEM, CONTROLLER, GAME DEVICE, CONTROL METHOD FOR GAME DEVICE, AND PROGRAM

BACKGROUND

The present disclosure relates to a game system, a controller, a game device, a control method for such a game device, and a program.

Some game devices are operated using a controller associated with a user. When a screen associated with the user is being displayed on this type of game device, the game device can be operated by the controller associated with that user.

SUMMARY

It may be desired that the game device be connected with a general-purpose controller such as a television (TV) remote control to view videos, for example. In such a case, an inconvenience may be experienced if the game device can be operated only by the controller associated with a particular user. Where a minimally individualized general-purpose function such as viewing of videos is being executed, it is preferred that anyone be allowed to perform such common operations as playing of a video.

The present disclosure has been made in view of the above circumstances and provides a game system including a game device and a controller and enabling a process of a general-purpose function not associated with the user using the controller to be executed in accordance with a function of operating members of the controller.

In solving the above problem and according to one embodiment of the present disclosure, there is provided a game system including a game device used by a first user and a second user and a controller. The game device includes: an association section configured to associate the controller with the first user using the controller; a first process executing section configured such that during execution of a general-purpose function associated with neither the first user nor the second user, the first process executing section executes a process of the general-purpose function in accordance with first operating information acquired from the controller; and a second process executing section configured such that during execution of a first user function associated with the first user, the second process executing section executes a process of the first user function in accordance with second operating information acquired from the controller. The controller includes: a first operating member configured to be associated with the first operating information; a second operating member configured to be associated with the second operating information; an operation receiving section configured to receive an operation on one of the first and the second operating members; and an operating information outputting section configured to output to the game device one of the first and the second operating information associated with the operation on the corresponding one of the first and the second operating members.

Preferably in the above game system, the game device may include a second process limiting section configured such that during non-execution of the first user function associated with the first user, the second process limiting section limits execution of the process of the first user function in accordance with the second operating information acquired from the controller.

Preferably in the above game system, the game device may include a first process limiting section configured such that during non-execution of the general-purpose function associated with neither the first user nor the second user, the first process limiting section limits execution of the process of the general-purpose function in accordance with the first operating information acquired from the controller.

In solving the above problem and according to another embodiment of the present disclosure, there is provided a controller connected with a game device used by a first user and a second user. The controller includes: a first operating member configured such that during execution of a general-purpose function associated with neither the first user nor the second user, the first operating member is associated with first operating information for executing a process of the general-purpose function; a second operating member configured such that during execution of a first user function associated with the first user, the second operating member is associated with second operating information for executing a process of the first user function; an operation receiving section configured to receive an operation on one of the first and the second operating members; and an operating information outputting section configured to output to the game device one of the first and the second operating information associated with the operation on the corresponding one of the first and the second operating members.

In solving the above problem and according to a further embodiment of the present disclosure, there is provided a game device connected with a controller and used by a first user and a second user. The game device includes: an association section configured to associate the controller with the first user using the controller; a first process executing section configured such that during execution of a general-purpose function associated with neither the first user nor the second user, the first process executing section executes a process of the general-purpose function in accordance with first operating information acquired from the controller; and a second process executing section configured such that during execution of a first user function associated with the first user, the second process executing section executes a process of the first user function in accordance with second operating information acquired from the controller.

According to an even further embodiment of the present disclosure, there is provided a control method for a game device connected with a controller and used by a first user and a second user. The control method includes: associating the controller with the first user using the controller; during execution of a general-purpose function associated with neither the first user nor the second user, executing a process of the general-purpose function in accordance with first operating information acquired from the controller; and during execution of a first user function associated with the first user, executing a process of the first user function in accordance with second operating information acquired from the controller.

According to a still further embodiment of the present disclosure, there is provided a program for causing a game device connected with a controller and used by a first user and a second user, including: by an association section, associating the controller with the first user using the controller; by a first process executing section, during execution of a general-purpose function associated with neither the first user nor the second user, executing a process of the general-purpose function in accordance with first operating information acquired from the controller; and by a second process executing section, during execution of a first user function associated with the first user, executing a process of the first user function in accordance with second operating information acquired from the controller. This program may be stored on a computer-readable information storage medium.

BRIEF DESCRIPTION OF THE DRAWINGS

FIG. 5 is a schematic diagram showing a typical appearance of an audio video (AV) remote controller in one embodiment of the present disclosure;

DETAILED DESCRIPTION OF THE PREFERRED EMBODIMENTS

[First Embodiment]

Figure 1:
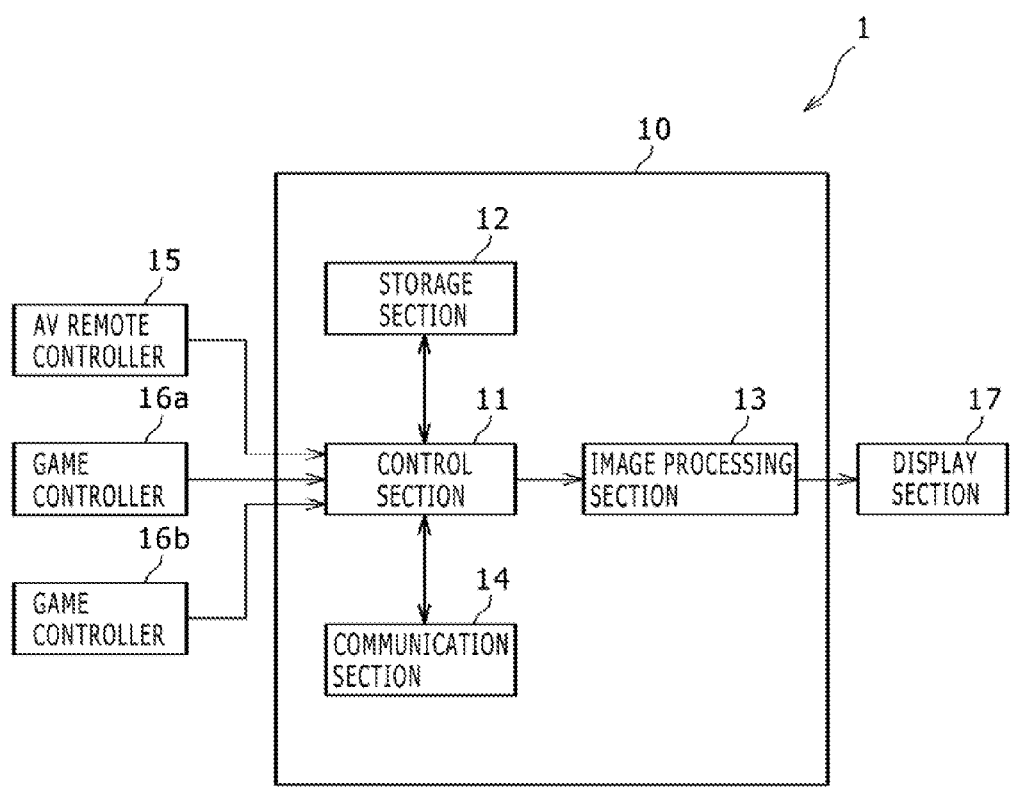
FIG. 1 is a configuration diagram showing a typical overall configuration of a game system in one embodiment of the present disclosure.

FIG. 1 is a configuration diagram showing a typical overall configuration of a game system 1 in a first embodiment of the present disclosure. The game system 1 in the embodiment includes a display section 17, a game device 10, and multiple controllers capable of operating the game device 10.

The game device 10 is an information processing device used by a user to play games and view videos. For example, the game device 10 may be a home-use game machine, a handheld video game machine, or a personal computer. As shown in FIG. 1, the game device 10 in the embodiment includes a control section 11, a storage section 12, an image processing section 13, and a communication section 14. The game device 10 is connected with an AV remote controller 15, a game controller 16a, another game controller 16b, and a display section 17.

The control section 11 includes a program control device such as a central processing unit (CPU) and executes diverse information processing in accordance with programs stored in the storage section 12. The storage section 12 includes a memory device such as a random access memory (RAM) or a read-only memory (ROM) storing the programs to be executed by the control section 11 and the data to be processed by the programs. The storage section 12 also functions as a work memory for the control section 11.

The image processing section 13 includes a graphical processing unit (GPU) and a frame buffer memory, for example. In accordance with a drawing instruction from the control section 11, the image processing section 13 draws an image to be displayed on the screen of the display section 17. As a specific example, the image processing section 13 may have a frame buffer memory corresponding to the screen of the display section 17. Under instructions from the control section 11, the GPU writes images to the frame buffer memory at predetermined time intervals. The image written to the frame buffer memory is converted to a video signal in a suitably timed manner and displayed on the screen of the display device 17.

The communication section 14 is an interface that transmits and receives data to and from another device via a communication network. The game device 10 transmits and receives information to and from another device via the communication section 14. In the embodiment, the communication section 14 transmits and receives information to and from the AV remote controller 15 and the game controller 16 (16a and 16b) using a wireless communication function such as Bluetooth (registered trademark).

The AV remote controller 15 is a device that receives the input of the user's operations. For example, the AV remote controller 15 may be a general-purpose controller for operating an AV amplifier, a TV set, or a home-use game machine. The user operates the AV remote controller 15 to input various instructions to the AV amplifier, the TV set, or the home-use game machine. In the embodiment, the AV remote controller 15 is assumed to be used primarily for operating the game device 10. The AV remote controller 15 may include part or all of the functions provided by the game controller 16 dedicated for use with the game device 10.

The game controller 16 is a device that receives the input of the user's operations. For example, the game controller 16 may be a controller for a home-use game machine. The user operates the game controller 16 to input various instructions to the game device 10. In the embodiment, the game controller 16 is assumed to be dedicated for use with the game device 10.

The display section 17 is a display device such as a home-use TV set or a liquid crystal display. The display section 17 displays the image corresponding to the video signal output from the image processing section 13.

Figures 2, 3:
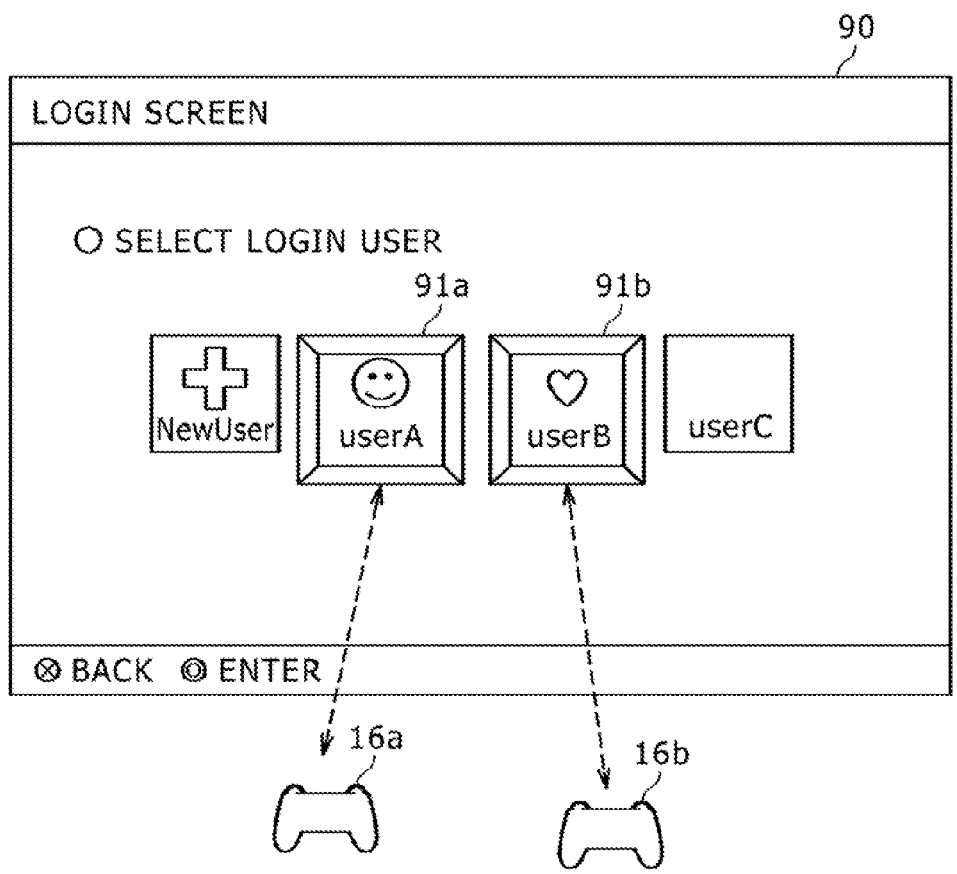
FIG. 2 is a schematic diagram showing typical use status of a game device in one embodiment of the present disclosure.
FIG. 3 is a tabular view showing a typical association table associating controller identifiers with user identifiers in one embodiment of the present disclosure.

FIG. 2 is a schematic diagram showing typical use status of the game device 10 in the embodiment. Multiple users can use the same game device 10 in the embodiment. Each user can use the game device 10 by creating an individual account for login purposes. FIG. 2 shows a typical login screen 90 displayed when the game device 10 is started. On the login screen 90, user A operating the game controller 16*a* can log in by selecting a login image 91 (login image 91*a* corresponding to an account name "user A" on the screen) for login to his/her account. At this point, the game controller 16*a* is associated with a user identifier identifying the user A (e.g., account name "user A"). That is, the operator of the game controller 16*a* is identified as the user A. Thereafter, the operating instructions output from the game controller 16*a* will be processed as the information regarding "user A." On the same login screen 90, user B operating the game controller 16*b* can log in by selecting another login image 91 (login image 91*b* corresponding to an account name "user B" on the screen) for login to his/her account. The game controller 16*b* is then associated with a user identifier identifying the user B (e.g., account name "user B"). The operator of the game controller 16*b* is thus identified as the user B. Thereafter, the operating instructions output from the game controller 16*b* will be processed as the information regarding "user B."

Once the game controller 16 is associated with the user identifier, the association information about the game controller 16 and the corresponding user identifier is stored into the storage section 12 of the game device 10. FIG. 3 is a tabular view showing a typical association table Tb1100 associating controller identifiers with user identifiers in the embodiment. As shown in FIG. 3, each controller identifier identifying the corresponding controller connected to the game device 10 is stored in association with the user identifier identifying the user operating that controller. In FIG. 3, a controller identifier C001 identifying the game controller 16*a* is associated with the user identifier A identifying the user A, and a controller identifier C002 identifying the game controller 16*b* is associated with the user identifier B identifying the user B. The game device 10 determines the user from the information identifying the controller (controller identifier C001 or C002) in the association table Tb1100. The game controller 16, it should be noted, is not the only controller connectable with the game device 10. The AV remote controller 15 or some other suitable controller may be connected instead. In such cases, each controller identifier identifying the corresponding controller is also stored in the association table Tb1100 in association with the user identifier identifying the user operating the controller.

With the game device 10 identifying the user from the controller identifier, during execution of a user function associated with the identified user (e.g., while a user screen associated with the user is being displayed on the display section 17), all operating instructions from any other user with regard to that user function may be arranged to be rejected. Also, upon receipt of an operating instruction from another user, the execution of the process corresponding to the operating instruction may be limited. Rejecting the operating instructions from any other user constitutes effective means to improve security, particularly when highly individualized information is displayed, such as at the time of displaying the user's account information or at the time of purchasing a game.

Figure 4:
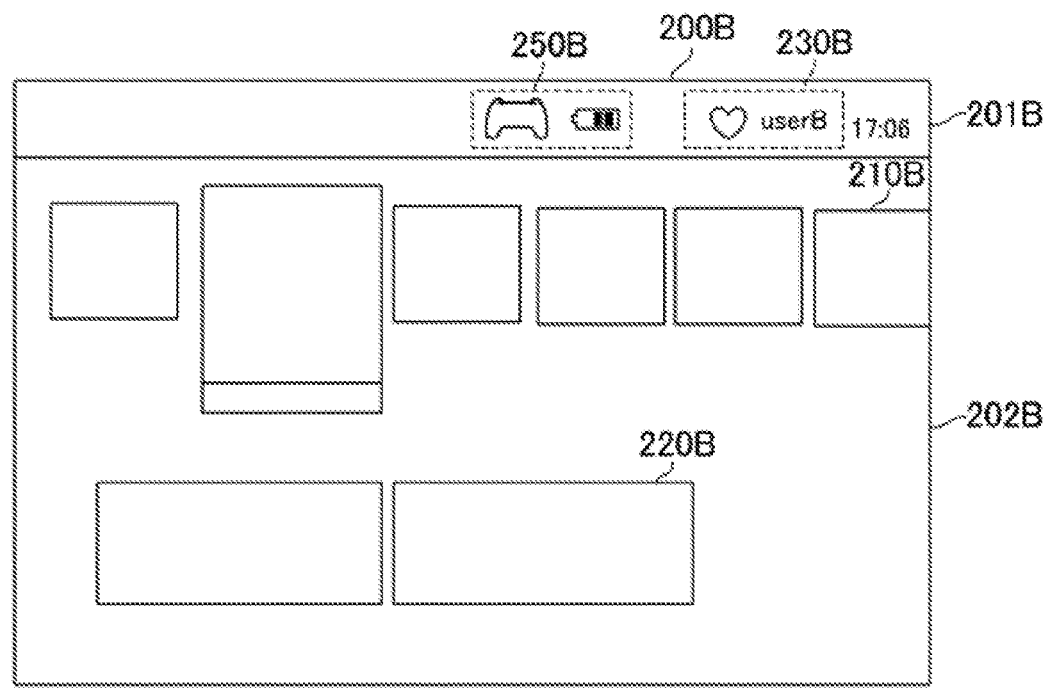
FIG. 4 is a schematic diagram showing a typical user screen associated with a user displayed on a display section in one embodiment of the present disclosure.

FIG. 4 is a schematic diagram showing a typical user screen associated with the user displayed on the display section 17 in the embodiment. A user screen 200B shown in FIG. 4 is a top screen displayed after the user B has logged in, for example. The user screen 200B is the screen generated for each user (the screen is associated with the user B in this case). For example, the user screen 200B includes a function area 201B and a main area 202B. The function area 201B may display a user identifying icon 230B identifying the operating user and a function icon 250B indicating the function used by the user. In FIG. 4, the user identifying icon 230B displays an icon identifying the user B, and the function icon 250B displays an icon indicating the game controller 16*b* operated by the user B and an icon indicating the remaining battery level of the game controller 16*b*. The main area 202B may display a starting image 210B for starting various applications and an execution history image 220B indicating the execution history of applications. The diverse items of information displayed on the user screen 200B reflect the use status of the game device 10 as used by the user B. For example, the function icon 250B reflects the controller associated with the user B as determined in reference to the association table Tb1100.

During display of the user screen 200B associated with the user B as shown in FIG. 4, the game device 10 basically executes only the processes corresponding to the operating instructions from the game controller 16*b* operated by the user B. For example, if the game controller 16*a* operated by the user A outputs operating information for selecting the starting image 210B, the game device 10 rejects the operating information from the game controller 16*a* operated by the user A that is not associated with the user identifier B. Alternatively, the game device 10 will not execute the process of selecting the starting image 210B even if receiving the operating information from the game controller 16*a* operated by the user A.

However, during execution of a general-purpose function of relatively low individuality such as watching of TV programs, viewing of videos, or playing of music, an inconvenience would be experienced if the operating instructions from any other user were rejected. For example, when TV programs are to be watched, videos are to be viewed, or music is to be played, the general-purpose AV remote controller 15 may be easier to operate than a game controller dedicated for use with a game device. With the AV remote controller 15 connected to the game device 10 for control use, if a specific user were associated with the AV remote controller 15 as with the above-described game controller 16, only the user function associated with that user could be operated. It is thus preferred that the AV remote controller 15 be used by anyone for performing operations to view videos or to play music (e.g., play, stop, volume control). In the embodiment, during execution of a general-purpose function not associated with the user operating the AV remote controller 15, the game system 1 enables the operations received from the AV remote controller 15 to be performed with the general-purpose function. The AV remote controller 15 connected with the game device 10 has first operating members and second operating members. The first operating members are associated with the functions that can be processed during execution of a general-purpose function not associated with the user operating the AV remote controller 15, and the second operating members are associated with the functions for executing processes of the user function associated with the user operating the AV remote controller 15.

FIG. 5 is a schematic diagram showing a typical appearance of the AV remote controller 15 in the embodiment. As shown in FIG. 5, the surface of the AV remote controller 15 has a first operating member group 150 composed of multiple first operating members, a second operating member group 160 made up of multiple second operating members, and a third operating member group 170 formed by multiple third operating members. The first operating members are associated with the functions that can be processed regardless of the user operating the AV remote controller 15 and regardless of the user associated with the function currently executed by the game device 10. The first operating members are basically assigned the functions that can be operated by anyone with no trouble. In the embodiment, as shown in FIG. 5, the first operating members include a play button 151 associated with the function of reproducing videos and music and a volume key 152 associated with the function of controlling the sound volume, for example. Meanwhile, the second operating members are associated with the function of executing the process of the user function associated with the user operating the AV remote controller 15. In the embodiment, the second operating members are assumed to have the functions similar to those of the operating members of the game controller 16. For example, the second operating members include a "circle (○) button," a "cross (×) button," a "square (□) button," a "triangle (Δ) button," and arrow keys arranged on the game controller 16. The second operating members may also function as the first operating members that can be processed regardless of the user operating the AV remote controller 15. The third operating members are associated with the function of executing the process of the user function associated with the user operating the AV remote controller 15. In particular, the third operating members are each assigned the function of executing the process of a highly individualized function for the user. In the embodiment, the third operating members are each assigned the function of switching to a user function principally associated with the user operating the AV remote controller. For example, the third operating members include a home button 171 with the function of displaying the top screen associated with the user, and a share button 172 with the function of starting an application for uploading videos, among others, owned by the user. These functions corresponding to the third operating members are arranged to be processed only if the user operating the AV remote controller 15 is identified. If no user identifier is associated with the AV remote controller 15, then the game device 10, before executing a process corresponding to any of the third operating members, needs to identify the user by having a suitable user identifier associated with the AV remote controller 15.

Figure 6:
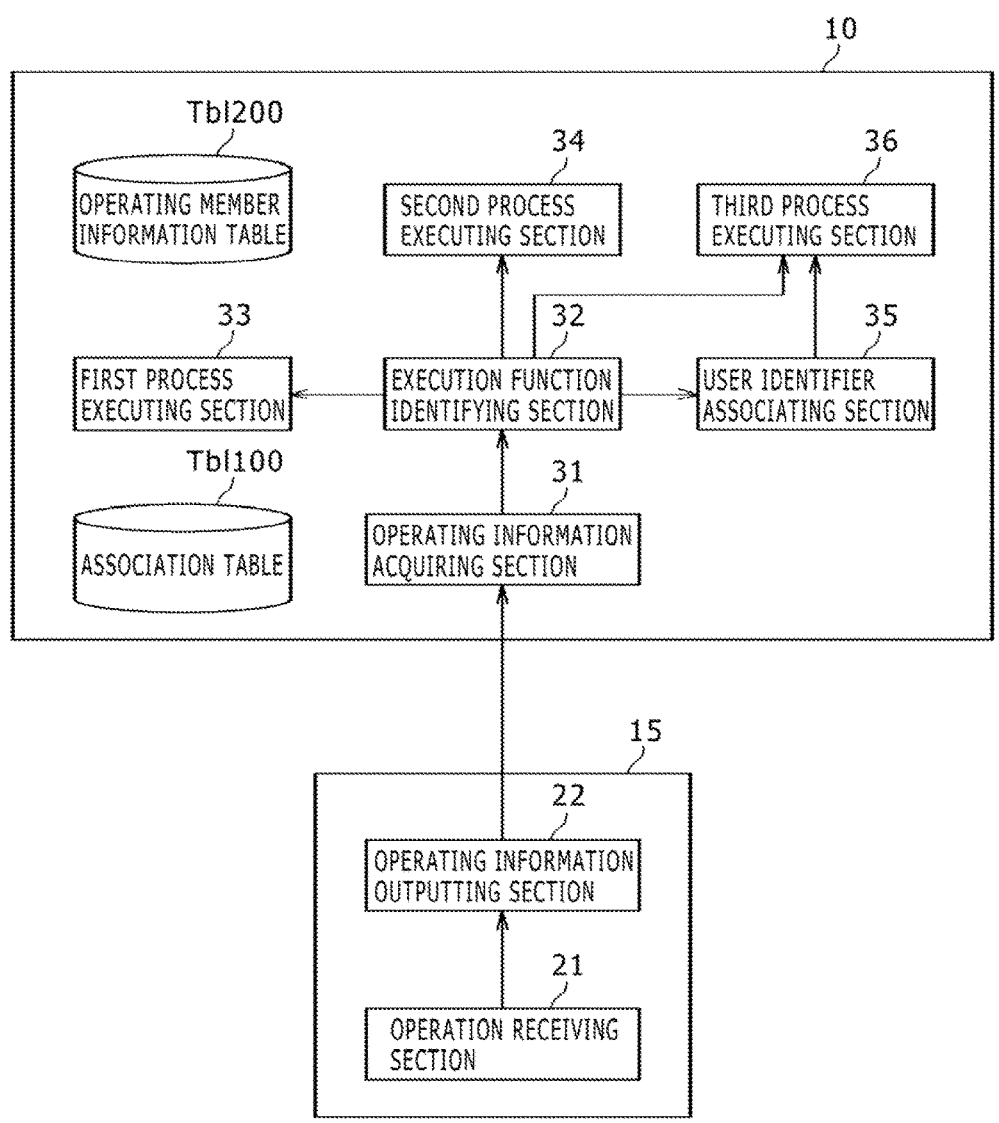
FIG. 6 is a functional block diagram showing typical functions implemented by the game device and the AV remote controller in one embodiment of the present disclosure.

FIG. 6 is a functional block diagram showing typical functions implemented by the game device 10 and the AV remote controller 15 in the embodiment. As shown in FIG. 6, the AV remote controller 15 in the embodiment functionally includes an operation receiving section 21 and an operating information outputting section 22. These functions are implemented by a control section executing a programs stored in a storage section of the controller. This program may be stored on any of various computer-readable information storage media such as optical disks or downloaded via the communication network when offered.

The game device 10 in the embodiment functionally includes an operating information acquiring section 31, a first process executing section 33, a second process executing section 34, a user identifier associating section 35, a third process executing section 36, an association table Tb1100, and an operating member information table Tb1200. The functions of the operating information acquiring section 31, the first process executing section 33, the second process executing section 34, the user identifier associating section 35, and the third process executing section 36 are implemented by the control section 11 executing a program stored in the storage section 12 of the game device 10. This program may be stored on any of various computer-readable information storage media such as optical disks or downloaded via the communication network such as the Internet when offered. The association table Tb1100 and the operating member information table Tb1200 are implemented in the storage section 12.

The operation receiving section 21 of the AV remote controller 15 receives operations performed on the operating members of the AV remote controller 15.

The operating information outputting section 22 of the AV remote controller 15 generates the operating information representing the operation received by the operation receiving section 21 and outputs the generated operating information to the game device 10. In this case, the operating information outputting section 22 may output as the operating information either an operating member code identifying the corresponding operating member or information indicative of the function associated with the operating member. When the information indicative of the function is output as the operating information, the game device 10 can identify the function to be executed from the operating information. When the operating member code is output as the operating information, the game device 10 needs to retain association information by which each operating member code is associated with the corresponding function so as to identify the function corresponding to the received operating member code. There may be a case where one operating member is associated with multiple functions. For example, pressing an operating member once may designate one function, and holding down the same operating member may designate another function. In that case, a code allocated to each function may be output as the operating information.

The operating information acquiring section 31 of the game device 10 acquires the operating information output from the operating information outputting section 22 of the AV remote controller 15.

An execution function identifying section 32 of the game device 10 identifies both the type of the operating information acquired by the operating information acquiring section 31 and the function currently executed by the game device 10. The operating information type indicates which of the operating members has been operated to output the operating information. It is assumed here that first operating information is output by operation of any of the first operating members, second operating information is output by operation of any of the second operating members, and third operating information is output by operation of any of the third operating members. Specifically, if the game device 10 is executing a general-purpose function and if the acquired operating information is identified as the first operating information, the operating information is processed by the first process executing section 33. If the game device 10 is executing a user function and if the acquired operating information is identified as the second operating information, the operating information is processed by the second process executing section 34. If the acquired operating information is identified as the third operating information, the operating information is processed by the third process executing section 36.

The first process executing section 33 of the game device 10 executes the process on the basis of the first operating information acquired by the operating information acquiring section 31. In this case, during execution of a general-purpose function not associated with the user using the game device 10, the first process executing section 33 executes the process of the general-purpose function in accordance with the first operating information acquired by the operating information acquiring section 31. Specifically, the process executed by the first process executing section 33 is one which is executed by the general-purpose function such as a video playing function currently executed by the game device 10. The first process executing section 33 executes the process on the basis of the first operating information associated with the general-purpose function. Meanwhile, during non-execution of a general-purpose function associated with none of the users using the game device 10, the first process executing section 33 limits execution of the process of the general-purpose function in accordance with the first operating information acquired by the operating information acquiring section 31. That is, if the game device 10 is not executing any general-purpose function, no process is executed even given the first operating information associated with the general-purpose function.

The second process executing section 34 of the game device 10 executes the process on the basis of the second operating information acquired by the operating information acquiring section 31. In this case, during execution of a user function associated with the user operating the AV remote controller 15, the second process executing section 34 executes the process of the user function in accordance with the second operating information acquired by the operating information acquiring section 31. Specifically, the process executed by the second process executing section 34 is one which is executed by the user function associated with the user, such as a game application currently executed by the game device 10. The second process executing section 34 executes the process on the basis of the second operating information associated with the user function. Meanwhile, during non-execution of the user function associated with the user operating the AV remote controller 15, the second process executing section 34 limits execution of the process of the user function in accordance with the second operating information acquired by the operating information acquiring section 31. That is, the user function processes only the second operating information from the controller operated by the user associated with the user function.

The user identifier associating section 35 of the game device 10 associates the controller connected to the game device 10 with the user identifier identifying the user operating the connected controller. As described above, when the user operating the controller selects the login image 91 on the login screen 90 in FIG. 2 to log in to his/her account, the user identifier associating section 35 associates the controller with the user identifier identifying the user.

The third process executing section 36 of the game device 10 executes the process on the basis of the third operating information acquired by the operating information acquiring section 31. In this case, even during execution of any function, i.e., regardless of the general-purpose function or the user function associated with the user being executed, the third process executing section 36 executes the process associated with the third operating information in accordance therewith following acquisition of the information by the operating information acquiring section 31. Specifically, the third process executing section 36 primarily executes the process of switching to, and executing, the user function designated by the third operating information.

Figure 7:
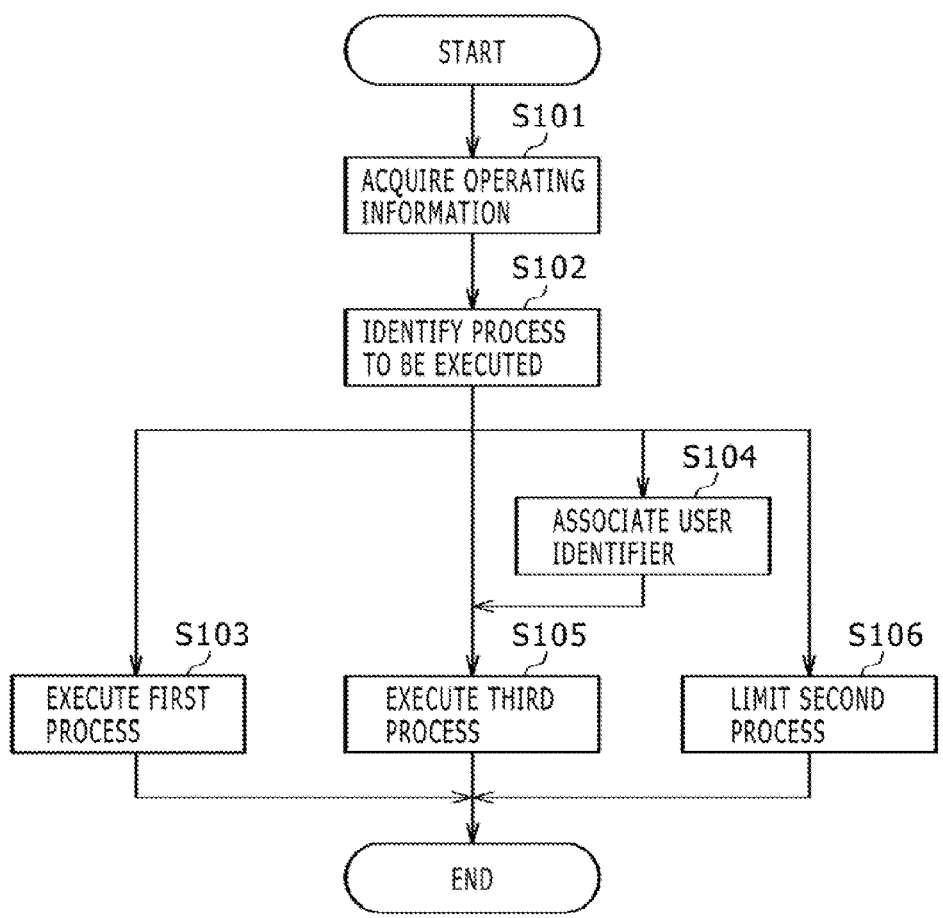
FIG. 7 is a flowchart of a typical process executed by the game system under operating instructions from the AV remote controller in one embodiment of the present disclosure.

Explained below with reference to the flowchart shown in FIG. 7 is a typical process executed by the game system 1 under operating instructions from the AV remote controller 15 in the embodiment.

Figures 8, 9:
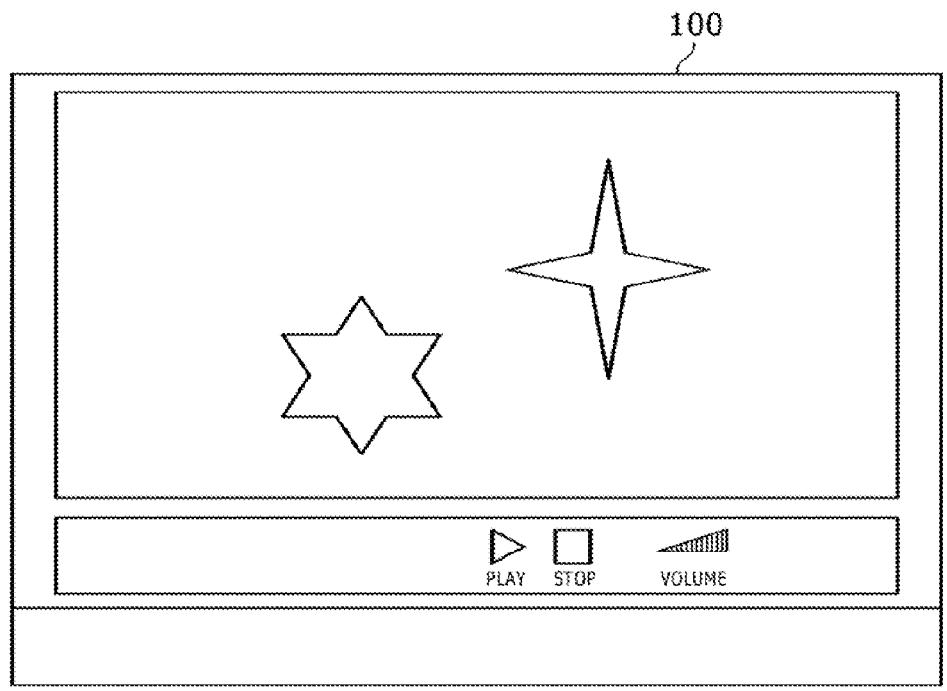
FIG. 8 is a schematic diagram showing a general screen in one embodiment of the present disclosure.
FIG. 9 is a tabular view showing a typical operating member information table stored in a storage section of the game device in one embodiment of the present disclosure.

The game device 10 is assumed to be executing a general-purpose function associated with none of the users using the game device 10. It is also assumed here that the video playing function is being executed as the general-purpose function associated with none of the users using the game device 10. FIG. 8 is a schematic diagram showing a general screen 100 displayed on the display section 17 in the embodiment. The general screen 100 shown in FIG. 8 is displayed when the game device 10 executes the application for playing videos.

With the general screen 100 displayed as shown in FIG. 8, the user A operates the AV remote controller 15. This causes the operating information acquiring section 31 of the game device 10 to acquire the operating information output from the AV remote controller 15 (step S101).

In this example, the operating information output from the AV remote controller 15 may be the operating member code identifying the operating member operated by the user A. The storage section 12 of the game device 10 is assumed to store in advance the operating member information table Tb1200 that associates operating member codes, operating member functions, and operating information types with one another. FIG. 9 is a tabular view showing a typical operating member information table Tb1200 stored in the storage section 12 of the game device 10 in the embodiment. As shown in FIG. 9, the operating member information table Tb1200 holds the operating member codes each identifying the corresponding operating member of the AV remote controller 15, the functions each associated with the corresponding operating member, and the information indicative of different operating information types (information indicating the first operating information, the second operating information, etc.), all associated with one another for management purposes. Referencing the operating member information table makes it possible to identify the function associated with the operating information (operating member code) acquired by the operating information acquiring section 31 of the game device 10, as well as the type of the operating information.

The operating member information table may be managed for each function executed by the game device 10. For example, the first operating member group 150 of the AV remote controller 15 in FIG. 5 may be associated with a predetermined general-purpose function executed by the game device 10. The general-purpose function may then receive only the operating information regarding the operating members included in the first operating member group 150 and reject the operating information regarding any other operating members. Also, different functions may be associated with each operating member depending on the function executed by the game device 10. For example, where an operating member "circle button" is arranged on the AV remote controller 15, the function associated with the "circle button" may be either "enter" or "back" depending on the application in use. The functions associated with the operating members may be changed as desired by rewriting the operating member information table.

The execution function identifying section 32 identifies the function to be executed from the operating information acquired by the operating information acquiring section 31 (step S102). If the execution function identifying section 32 determines that the operating information acquired by the operating information acquiring section 31 of the game device 10 is the first operating information, the execution function identifying section 32 executes the process in accordance with the acquired operating information (step S103), and terminates the process.

Specifically, suppose that with the general screen 100 displayed as shown in FIG. 8, the play button 151 as one of the first operating members of the AV remote controller 15 is operated. Operating the play button 151 causes the operation receiving section 21 of the AV remote controller 15 to receive the operating instruction on the play button 151. The operating information outputting section 22 of the AV remote controller 15 outputs to the game device 10 the operating information indicative of an operating member code B001 representing the play button 151.

When the operating information acquiring section 31 of the game device 10 has acquired the operating information representative of the operating member code B001, the execution function identifying section 32 identifies as the first operating information the operating information acquired by reference to the operating member information table Tb1200. In turn, the first process executing section 33 executes the function (a playing process in this example) associated with the acquired operating information. With the first process executing section 33 executing the playing process of the video playing function, a video is displayed on the general screen 100 shown in FIG. 8.

As described, an operating instruction on any of the first operating members causes the corresponding process to be executed on the general screen 100 associated with none of the users using the game device 10.

It was explained above that the general screen is displayed on which the video playing function is executed as the general-purpose function associated with none of the users who use the game device 10. However, this example is not limitative of executable general-purpose functions. For example, a music playing function may be executed in the background as another general-purpose function associated with none of the users using the game device 10. In this case, the display section 17 may be arranged to display a user screen associated with one of the users using the game device 10 (such as the top screen associated with the user B and shown in FIG. 4), without displaying any screen regarding the music playing function. Also in this case, the first process executing section 33 executes the process of the music playing function in accordance with the operating instruction (e.g., stop, fast-forward) on any of the first operating members of the AV remote controller 15. In this manner, even during display of the user screen associated with a user different from the user operating the AV remote controller 15, as long as a general-purpose function is being executed, the process of the general-purpose function is executed in accordance with the operating instruction on any of the first operating members of the AV remote controller 15 Likewise, during display on the display section 17 of the top screen associated with the user A operating the AV remote controller 15, the process of the general-purpose function is executed in accordance with the operating instruction on any of the first operating members of the AV remote controller 15.

Meanwhile, if the execution function identifying section 32 determines that the operating information acquired by the operating information acquiring section 31 of the game device 10 is the third operating information, the execution function identifying section 32 further determines whether a user identifier is associated with the AV remote controller 15 having output the operating information. That is, the execution function identifying section 32 determines whether a user identifier is associated with the controller identifier identifying the AV remote controller 15 in the association table Tb1100.

If the execution function identifying section 32 determines that no user identifier is associated with the AV remote controller 15, the user identifier associating section 35 associates the AV remote controller 15 with the user identifier (step S104).

Specifically, suppose that the home button 171 is operated as one of the third operating members of the AV remote controller 15 not associated with any user identifier. The operation causes the operation receiving section 21 of the AV remote controller 15 to receive the operating instruction on the home button 171. The operating information outputting section 22 of the AV remote controller 15 outputs to the game device 10 the operating information indicative of an operating member code B003 representing the home button 171.

When the operating information acquiring section 31 of the game device 10 has acquired the operating information indicative of the operating member code B003, the execution function identifying section 32 identifies as the third operating information the operating information acquired by reference to the operating member information table Tb1200, and determines that no user identifier is associated with the AV remote controller 15. In this case, the login screen 90 shown in FIG. 2 is displayed on the display section 17. It should be noted that the top screen, which is the function associated with the operating member code B003, varies from one user to another and it is difficult to be displayed unless the user is identified. The user operating the AV remote controller 15 is thus prompted to log in to let the user identifier associating section 35 associate the AV remote controller 15 with the user identifier. Once the AV remote controller 15 is associated with the user identifier by the user identifier associating section 35, the controller identifier identifying the AV remote controller 15 is stored into the association table Tb1100 in association with the user identifier. This enables the user operating the AV remote controller 15 to be identified and the top screen associated with the identified user to be displayed. For example, on the login screen 90 shown in FIG. 2, the user A operates on the login image 91 to log in to his/her account (login image 91a associated with the account name "user A" in FIG. 2). This causes a controller identifier C003 identifying the AV remote controller 15 to be stored into the association table Tb1100 in association with the user identifier A identifying the user A. This is how the user operating the AV remote controller 15 is identified.

In step S104, the user identifier associating section 35 associates the AV remote controller 15 with the user identifier. In turn, the third process executing section 36 executes the process on the basis of the user identifier associated by the user identifier associating section 35 and the operating information acquired by the operating information acquiring section 31 (step S105), and terminates the process.

If the execution function identifying section 32 determines in step S102 that the acquired operating information is the third operating information and that the user identifier is associated with the AV remote controller 15, then the third process executing section 36 executes the process on the basis of the user identifier associated with the AV remote controller 15 and the operating information acquired by the operating information acquiring section 31 (step S105), and terminates the process.

Figure 10:
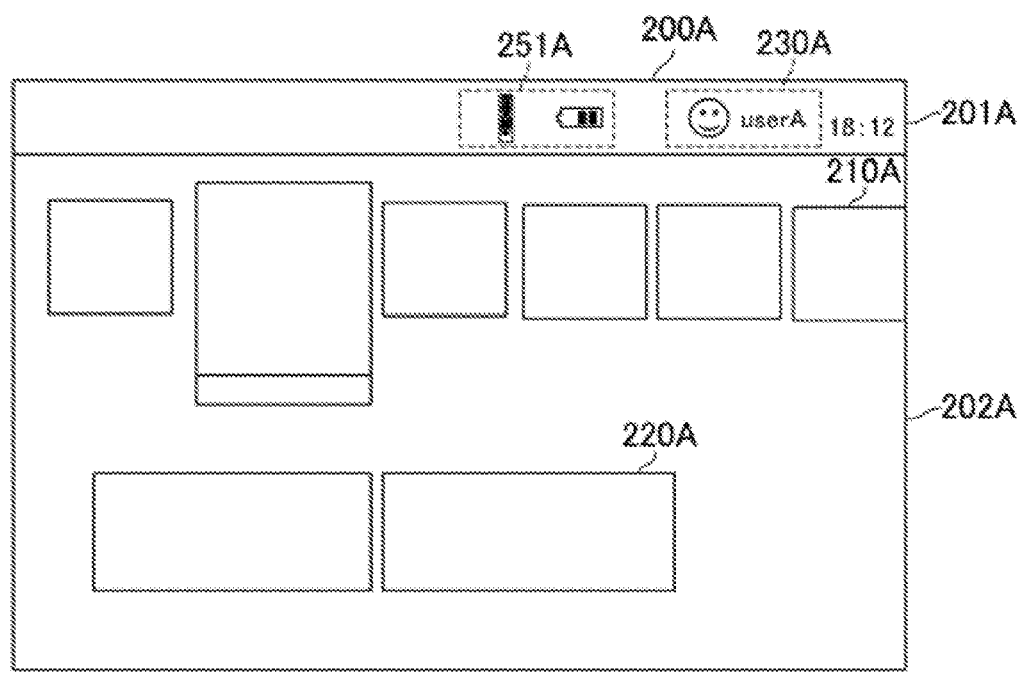
FIG. 10 is a schematic diagram showing a typical user screen associated with a user and displayed anew on the display section in one embodiment of the present disclosure.

In this example, the third process executing section 36 generates the user screen associated with the user A in accordance with the user identifier A associated with the AV remote controller 15, and substitutes the generated user screen for the general screen 100 displayed on the display section 17. FIG. 10 is a schematic diagram showing a typical user screen 200A associated with the user A and displayed anew on the display section 17 in the embodiment. The user screen 200A shown in FIG. 10 is the top screen displayed after the user A has logged in, for example. The user screen 200A in FIG. 10, which is the screen generated for each user (this screen is associated with the user A), includes a function area 201A and a main area 202A, for example. The function area 201A may display a user identifying icon 230A identifying the user doing the operation, and a function icon 251A indicating the function used by the user, for example. In FIG. 10, the user identifying icon 230A shows an icon indicative of the user A, while the function icon 251A shows an icon indicative of the AV remote controller 15 operated by the user A and an icon representative of the remaining battery level of the AV remote controller 15. The main area 202A shows a starting image 210A for starting various applications, and an execution history image 220A indicating the execution history of each application. The diverse items of information displayed on the user screen 200A reflect the use status of the game device 10 used by the user A. In this case, the function icon 251A reflects the association made between the AV remote controller 15 and the user identifier A by the user identifier associating section 35 in step S104 and stored into the association table Tb1100. In the table, the controller identifier C003 identifying the AV remote controller 15 is associated with the user identifier A identifying the user A. Incidentally, the manner in which each icon is shown in FIG. 10 is only an example and is not limitative of how the icons are to be displayed. For example, the function icon 251A may display solely the icon representative of the AV remote controller 15 without displaying the icon indicative of the remaining battery level of the AV remote controller 15.

With the user screen 200A displayed as shown in FIG. 10, the user A may operate one of the second operating members (e.g., an arrow key) of the AV remote controller 15. The operation causes the operating information acquiring section 31 of the game device 10 to acquire the operating information output from the AV remote controller 15. When the execution function identifying section 32 identifies the acquired operating information as the second operating information, the second process executing section 34 executes the process in accordance with the operating information. That is, on the user screen 200A, a selection cursor or like object is moved as directed by the arrow key being operated.

If the execution function identifying section 32 determines in step S102 that the operating information acquired by the operating information acquiring section 31 of the game device 10 is the second operating information, the second process executing section 34 limits execution of the process in accordance with the operating information (step S106), and terminates the process.

Specifically, with the general screen 100 displayed as shown in FIG. 8, suppose that the second operating member "circle button" of the AV remote controller 15 is operated. The operation causes the operation receiving section 21 of the AV remote controller 15 to receive the operating instruction on the "circle button." In turn, the operating information outputting section 22 of the AV remote controller 15 outputs to the game device 10 the operating information representative of an operating member code B004 of the "circle button."

When the operating information acquiring section 31 of the game device 10 has acquired the operating information representing the operating member code B004, the execution function identifying section 32 identifies as the second operating information the operating information acquired by reference to the operating member information table Tb1200. The execution function identifying section 32 further determines that the general screen 100 associated with none of the users using the game device 10 is being displayed and that the user function associated with the user operating the AV remote controller 15 is not being executed. As a result of this, the second process executing section 34 limits execution of the process associated with the operating information acquired by the operating information acquiring section 31. That is, the display of the general screen 100 shown in FIG. 8 remains unchanged because the second process executing section 34 does not execute an enter process associated with the "circle button."

It was explained above that the first operating members are associated with the video playing function executed as a general-purpose function. Other functions associated with the first operating members include a volume control function. Whereas the video playing function involves having the corresponding application executed by the game device 10, there is no need for the game device 10 to perform an application in executing the volume control function. Specifically, the volume control function is commonly executed not by the game device 10 but by the display section 17. In the embodiment, the operating information acquiring section 31 of the game device 10 acquires the operating information about the volume key 152 of the AV remote controller 15. In turn, the first process executing section 33 executes the process of outputting the acquired operating information to the display section 17 via a connector. The display section 17 then executes a volume control process on the basis of the acquired operating information. In this manner, the operation on any of the first operating members associated with the operating information that is output to an external device via the game device 10 may always processed by the first process operating section 33 where the game device 10 is connected with the external device. That is, whereas the operations on the first operating members associated with the video playing function are processed only if the game device 10 is executing the video playing function, the operation on the first operating member associated with the volume control function is processed even if the game device 10 is not executing the volume control function. Such operating information that is output to an external device via the game device 10 can be dealt with if the corresponding operation can be processed by the external device such as the display section 17. For example, another operation of this kind is a channel changing operation.

[Second Embodiment]

In the first embodiment, the game device 10 determines which of the first process executing section 33, the second process executing section 34, and the third process executing section 36 will execute the process depending on the operating member operated on the AV remote controller 15. In particular, if any of the third operating members is operated and if no user identifier is associated with the AV remote controller 15, the user identifier associating section 35 associate the AV remote controller 15 with the user identifier. In a second embodiment, by contrast, the user identifier associating section 35 associates the AV remote controller 15 with the user identifier at a timing given by a predetermined operating instruction such as when the game device 10 executes a predetermined application or displays a predetermined screen. In particular, the user identifier associating section 35 may be arranged to execute the process at a timing when a highly individualized user function is executed, such as at the time of acquiring an operating instruction to display a screen for connecting with external services such as a game purchasing screen or a social networking service (SNS) screen.

Specifically, the game device 10 is arranged to store the third operating information as the operating information type associated with the operating instruction to display a predetermined screen and the operating instruction to execute a predetermined application. In the above example, it was explained that the third operating information is associated with the third operating members of the AV remote controller 15. In the second embodiment, by contrast, the third operating information is associated with the instructions indicative of predetermined timings from the AV remote controller 15, such as the instruction to display a predetermined screen and the instruction to execute a predetermined application. That is, the execution function identifying section 32 identifies the process to be executed not at a timing when any of the operating members associated with the third operating information is operated but at a timing when an instruction with which the third operating information is associated is given.

For example, suppose that during operation of the first operating members of the AV remote controller 15 not associated with any user identifier, an operation is performed to give an instruction to execute a predetermined application associated with the third operating information. In such a case, the execution function identifying section 32 determines whether or not a user identifier is associated with the AV remote controller 15 having output the instruction associated with the third operating information. If no user identifier is determined to be associated, the execution function identifying section 32 prompts the user to perform a login operation by displaying the login screen 90 shown in FIG. 2. The login operation causes the user identifier associating section 35 to associate the AV remote controller 15 with the user identifier. After the user identifier associating section 35 has associated the AV remote controller 15 with the user identifier, the third process executing section 36 executes the predetermined application under instructions from the AV remote controller 15. If the AV remote controller 15 is determined to be associated with the user identifier, the predetermined application may be executed without delay under instructions from the AV remote controller 15. As described, during operation of the first operating members of the AV remote controller 15, no user is associated with the AV remote controller 15; the user is associated with the AV remote controller 15 only when a predetermined, highly individualized user screen is displayed. With the user identified only if the highly individualized screen is displayed, the security of the user is ensured while the user is being allowed to operate the game device 10 as desired using the AV remote controller 15.

[Third Embodiment]

With regard to the first and second embodiments, it was explained that the user identifier associating section 35 associates the AV remote controller 15 with the user identifier at a timing given by a predetermined operating instruction during operation of the predetermined operating members of the AV remote controller 15. In a third embodiment, by contrast, the user identifier associating section 35 associates the AV remote controller 15 with the user identifier at a timing when the AV remote controller 15 is connected to the game device 10 for the first time.

Explained below is an example in which a connection is established for the first time between the AV remote controller 15 operated by the user A and the game device 10.

Figure 11:
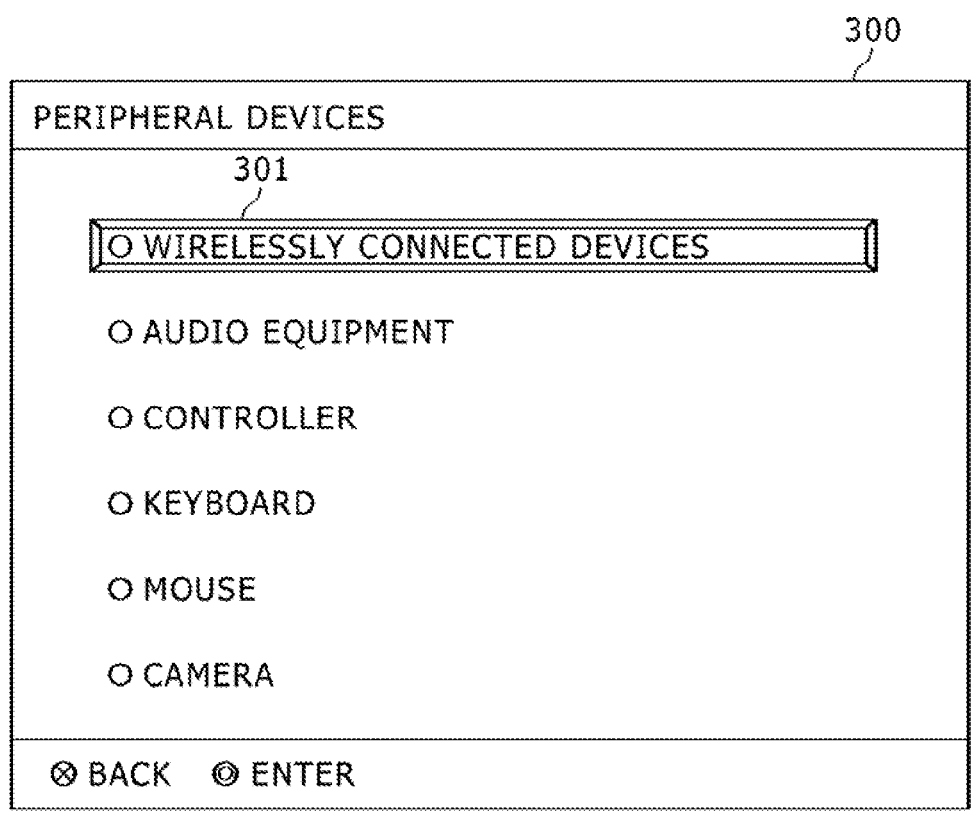
FIG. 11 is a schematic diagram showing a typical peripheral device setting screen displayed on the display section in one embodiment of the present disclosure.

When the user A connects the AV remote controller 15 to the game device 10, the display section 17 displays a peripheral device setting screen. FIG. 11 is a schematic diagram showing a typical peripheral device setting screen 300 displayed on the display section 17 in the third embodiment. The peripheral device setting screen 300 is used to set the peripheral devices connected to the game device 10 in wired or wireless fashion. Typical peripheral devices include audio equipment, a controller, a keyboard, a mouse, and a camera. As shown in FIG. 11, the peripheral device setting screen 300 includes multiple peripheral device selection items 301, each of which may be selectively designated by the user. When the user selectively designates one of the peripheral device selection items 301, a detail screen is displayed on which the peripheral device indicated by the selected peripheral device selection item 301 is to be set.

Figure 12:
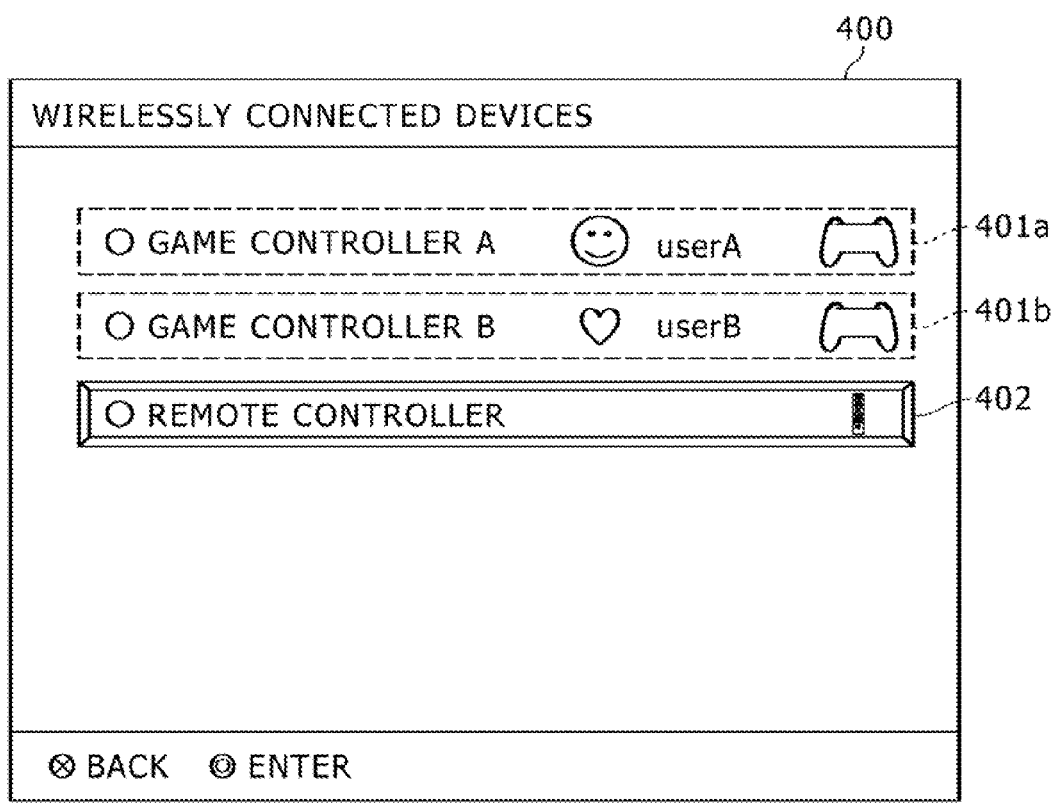
FIG. 12 is a schematic diagram showing a typical wirelessly connected device setting screen displayed on the display section in one embodiment of the present disclosure.

With this example, it is assumed that the user A, in setting a connection with the AV remote controller 15, selectively designates the peripheral device selection item 301 indicative of wirelessly connected devices. Selectively designating the peripheral device selection item 301 indicating wirelessly connected devices displays a wirelessly connected device setting screen 400. FIG. 12 is a schematic diagram showing a typical wirelessly connected device setting screen 400 displayed on the display section 17 in the embodiment. As shown in FIG. 12, the wirelessly connected device setting screen 400 displays a list of peripheral devices connected wirelessly with the game device 10. This list displays a controller item 401a indicative of a game controller A (corresponding to the game controller 16a in the embodiment), a controller item 401b indicative of a game controller B (corresponding to the game controller 16b in the embodiment), and a controller item 402 representative of the AV remote controller 15, each device being a peripheral device connected wirelessly with the game device 10. Each controller item may be selectively designated by the user. The selective designation of a given item by the user displays the detail screen on which the peripheral device indicated by the item is to be set. In this example, the controller items 401a and 401b are each associated with the user identifier identifying the user operating the corresponding game controller, whereas the controller item 402 has yet to be associated with the user identifier identifying the user operating the AV remote controller 15.

Figure 13:
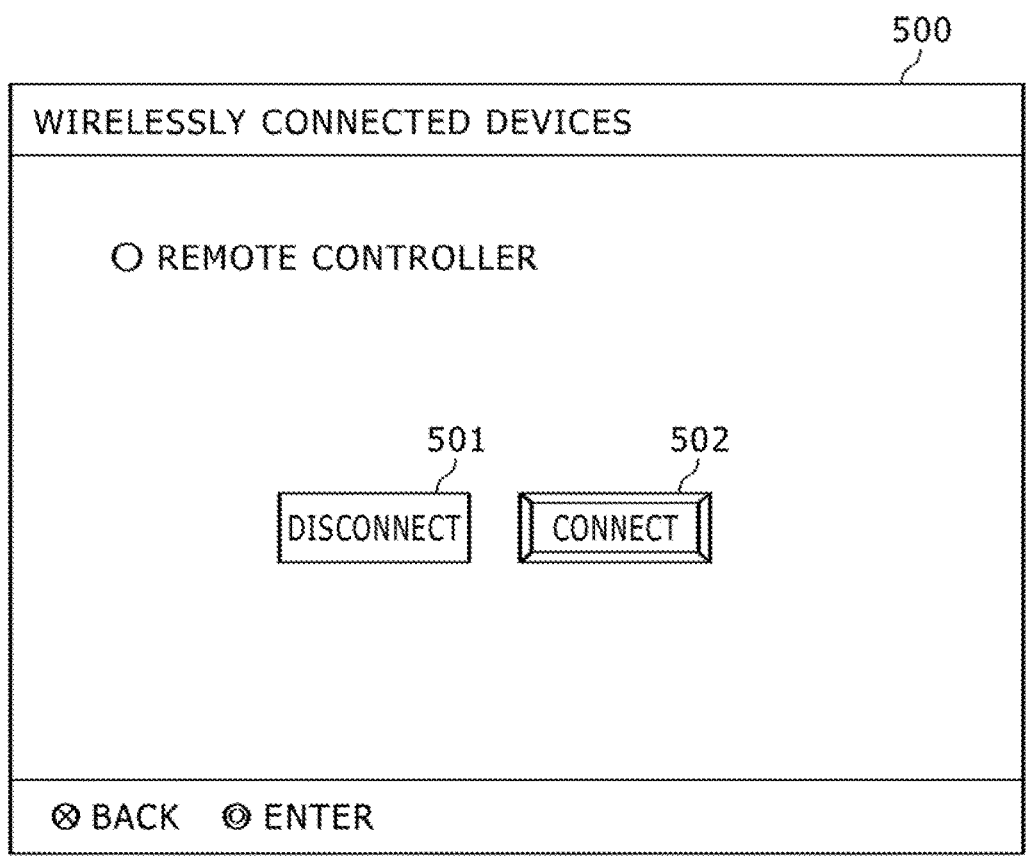
FIG. 13 is a schematic diagram showing a typical connecting operation screen displayed on the display section in one embodiment of the present disclosure.

The controller item 402 is selectively designated on the wirelessly connected device setting screen 400 shown in FIG. 12 in order to set the connection with the AV remote controller 15. The selective designation causes a connecting operation screen 500 to be displayed. FIG. 13 is a schematic diagram showing a typical connecting operation screen 500 displayed on the display section 17 in the embodiment. The connecting operation screen 500 shown in FIG. 13 includes a disconnect button 501 and a connect button 502, the disconnect button 501 being used to disconnect the connection between the AV remote controller 15 and the game device 10, the connect button 502 being used to establish the connection between the AV remote controller 15 and the game device 10.

Selectively designating the connect button 502 on the connecting operation screen 500 in FIG. 13 displays a screen for selecting the user who will operate the AV remote controller 15. This user selecting screen may be similar to the login screen 90 shown in FIG. 2. On the login screen 90 in FIG. 2, the user A logs in to his/her account by selecting the login image 91 (login image 91a corresponding to the account name "user A" in this example). At this point, the user identifier associating section 35 associates the AV remote controller 15 with the user identifier identifying the user A. The controller identifier identifying the AV remote controller 15 is stored into the association table Tb1100 in association with the user identifier identifying the user A.

That is, the operator of the AV remote controller 15 is identified as the user A. Thereafter, the second operating information output from the AV remote controller 15 is processed as the information about the user A. When the user identifier associating section 35 associates the AV remote controller 15 with the user identifier in accordance with the user's connecting instruction as described above, the connection between the AV remote controller 15 and the game device 10 is established.

The process executed by the game system 1 in accordance with operating instructions from the AV remote controller 15 following the establishment of the connection between the AV remote controller 15 and the game device 10 can be explained in reference to the flowchart of FIG. 7 and thus will not be discussed further.

The connection between the AV remote controller 15 and the game device 10 is disconnected by selectively designating the disconnect button 501 on the connecting operation screen 500 shown in FIG. 13. In other words, the association between the AV remote controller 15 and the user A is maintained until the disconnect button 501 is selectively designated on the connecting operation screen 500. Specifically, as long as the association between the AV remote controller 15 and the user A is maintained in the association table Tb1100, the user A can skip the display of the login screen for selecting the user who will operate the AV remote controller 15 when again logging in after a log-out or power deactivation. Meanwhile, there may be set a power-saving mode in which the AV remote controller 15 is deactivated after no operations on the AV remote controller 15 have been received for a predetermined time period. In this case, at return from power-saving mode, it is also possible to skip the display of the login screen for selecting the user who will operate the AV remote controller 15.

Figure 14:
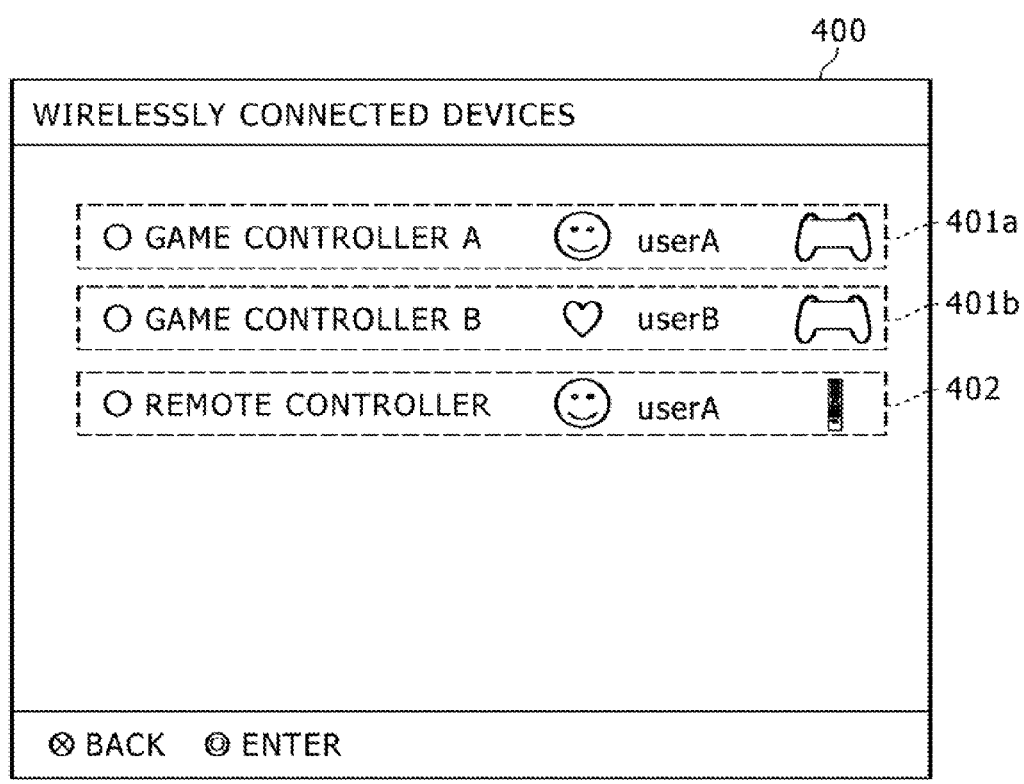
FIG. 14 is a schematic diagram showing a typical wirelessly connected device setting screen in effect after a connection is established between the AV remote controller and the game device.

FIG. 14 is a schematic diagram showing a typical wirelessly connected device setting screen 400 in effect after a connection is established between the AV remote controller 15 and the game device 10. On the wirelessly connected device setting screen 400, as shown in FIG. 14, the controller item 402 is associated with the user identifier "user A" of the user A. The wirelessly connected device setting screen 400 in FIG. 14 verifies that the user operating the AV remote controller 15 is the user A. Also, it shows that the user identifier of the user A is associated with both the controller item 401*a* and the controller item 402, which indicates that multiple different controllers may be associated with the same user.

Figure 15:
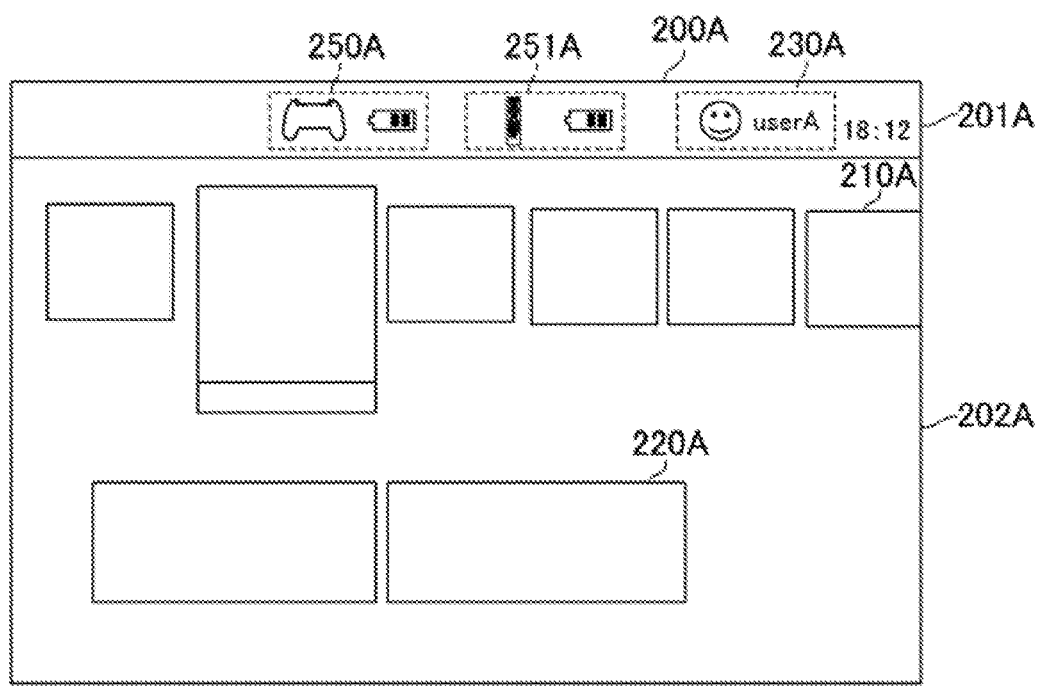
FIG. 15 is a schematic diagram showing a typical user screen associated with a user who uses multiple controllers.

FIG. 15 is a schematic diagram showing a typical user screen 200A associated with the user A who uses multiple controllers. The user screen 200A shown in FIG. 15 is the top screen associated with the user A. Except that it includes multiple function icons, the user screen 200A in FIG. 15 is structurally similar to the user screen 200A (top screen) in FIG. 10. Thus the same components as those of the user screen 200A in FIG. 10 are given the same reference symbols in FIG. 15, and their explanations are omitted where redundant. On the user screen 200A in FIG. 15, a function icon 250A displays an icon indicative of the game controller 16*a* used by the user A, and an icon indicative of the remaining battery level of the game controller 16*a*. Also on the user screen 200A, a function icon 251A displays an icon indicative of the AV remote controller 15 used by the user A, and an icon indicative of the remaining battery level of the AV remote controller 15. The display of the function icon 250A indicating the game controller 16*a* and the display of the function icon 251A representing the AV remote controller 15 verify that the user A uses two controllers 15 and 16*a*. During display of the user screen 200 shown in FIG. 15, the second process executing section 34 and the third process executing section 36 can deal with the operating information from the AV remote controller 15 operated by the user A and the operating information from the game controller 16*a* also operated by the user A.

The present disclosure contains subject matter related to that disclosed in Japanese Priority Patent Application JP 2015-039489 filed in the Japan Patent Office on Feb. 27, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A game system comprising
a game device used by a first user and a second user, and
a controller,
the game device including:
an association section configured to associate the controller with the first user using the controller;
a first process executing section configured such that during execution of a general purpose function associated with neither the first user nor the second user, and while executing a game application, the first process executing section executes a process of the general-purpose function in accordance with first operating information acquired from the controller; and
a second process executing section configured such that during execution of a first user function associated with the first user, the second process executing section executes a process of the first user function in accordance with second operating information acquired from the controller,
the controller including:
a first operating member configured to be associated with the first operating information;
a second operating member configured to be associated with the second operating information;
an operation receiving section configured to receive an operation on one of the first and the second operating members; and
an operating information outputting section configured to output to the game device one of the first and the second operating information associated with the operation on the corresponding one of the first and the second operating members.

2. The game system according to claim 1, wherein the game device includes a second process limiting section configured such that during non-execution of the first user function associated with the first user, the second process limiting section limits execution of the process of the first user function in accordance with the second operating information acquired from the controller.

3. The game system according to claim 1, wherein the game device includes a first process limiting section configured such that during non-execution of the general-purpose function associated with neither the first user nor the second user, the first process limiting section limits execution of the process of the general-purpose function in accordance with the first operating information acquired from the controller.

4. A controller connected with a game device used by a first user and a second user, the controller comprising:

a first operating member configured such that during execution of a general-purpose function associated with neither the first user nor the second user, and while executing a game application, the first operating member is associated with first operating information for executing a process of the general-purpose function;

a second operating member configured such that during execution of a first user function associated with the first user, the second operating member is associated with second operating information for executing a process of the first user function;

an operation receiving section configured to receive an operation on one of the first and the second operating members; and an operating information outputting section configured to output to the game device one of the first and the second operating information associated with the operation on the corresponding one of the first and the second operating members.

5. A game device connected with a controller and used by a first user and a second user, the game device comprising:

an association section configured to associate the controller with the first user using the controller;

a first process executing section configured such that during execution of a general-purpose function associated with neither the first user nor the second user, and while executing a game application, the first process executing section executes a process of the general-purpose function in accordance with first operating information acquired from the controller; and a second process executing section configured such that during execution of a first user function associated with the first user, the second process executing section executes a process of the first user function in accordance with second operating information acquired from the controller.

6. A control method for a game device connected with a controller and used by a first user and a second user, the control method comprising:

associating the controller with the first user using the controller;

during execution of a general-purpose function associated with neither the first user nor the second user, and while executing a game application, executing a process of the general-purpose function in accordance with first operating information acquired from the controller; and during execution of a first user function associated with the first user, executing a process of the first user function in accordance with second operating information acquired from the controller.

7. A non-transitory, computer readable storage medium containing a computer program, which when executed by a computer within a game device connected with a controller and used by a first user and a second user, causes the game device to carry out actions, comprising:

associating the controller with the first user using the controller;

during execution of a general-purpose function associated with neither the first user nor the second user, and while executing a game application, executing a process of the general-purpose function in accordance with first operating information acquired from the controller; and during execution of a first user function associated with the first user, executing a process of the first user function in accordance with second operating information acquired from the controller.

* * * * *